United States Patent [19]
Honma et al.

[11] Patent Number: 5,506,400
[45] Date of Patent: Apr. 9, 1996

[54] SCANNING TYPE PROBE MICROSCOPE

[75] Inventors: Akihiko Honma; Kazutoshi Watanabe, both of Tokyo, Japan

[73] Assignee: Seiko Instruments Inc., Tokyo, Japan

[21] Appl. No.: 220,103

[22] Filed: Mar. 30, 1994

[30] Foreign Application Priority Data

Mar. 31, 1993 [JP] Japan ................................. 5-074850

[51] Int. Cl.$^6$ ..................................... G01J 1/32
[52] U.S. Cl. ............................. 250/205; 372/31
[58] Field of Search ................ 250/205; 372/31

[56] References Cited

U.S. PATENT DOCUMENTS 4,565,197  1/1986  Daly .
5,359,434  10/1994  Nakao et al. .

Primary Examiner—Edward P. Westin
Assistant Examiner—Jacqueline M. Steady
Attorney, Agent, or Firm—Loeb and Loeb

[57] ABSTRACT

In a scanning type probe microscope, a semiconductor laser LD is driven by a current having a value not more than an oscillation threshold value using a constant current circuit for weak light, and weak light is used to perform positional adjustment of the position of the laser beam on a cantilever.

2 Claims, 4 Drawing Sheets

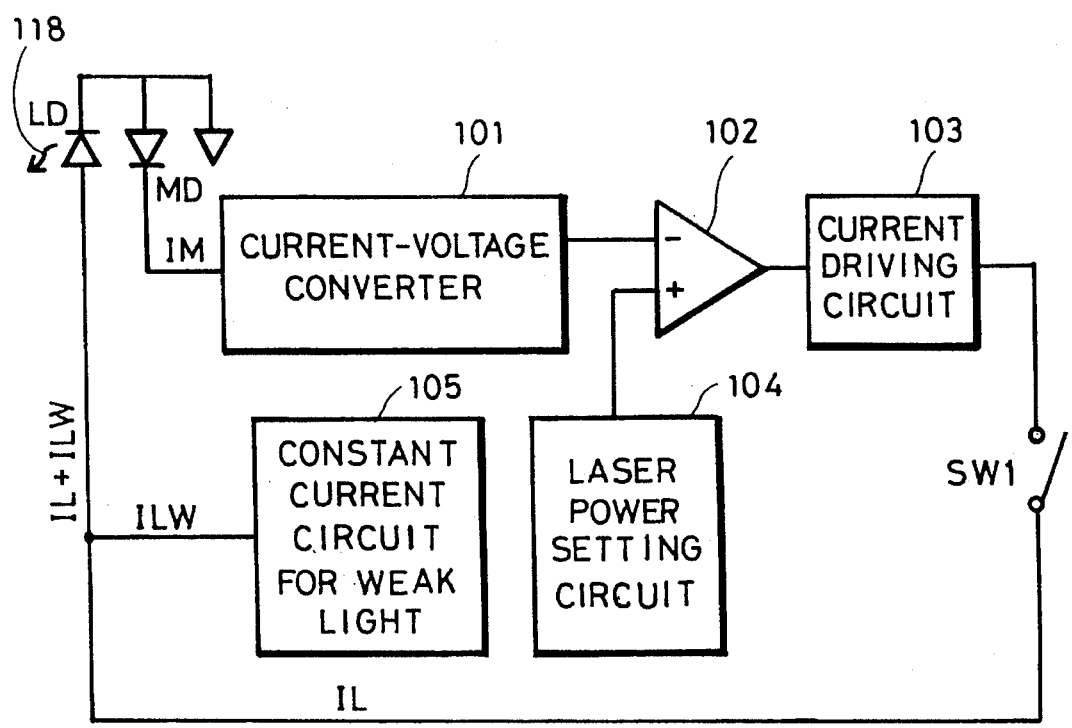
F I G. 1

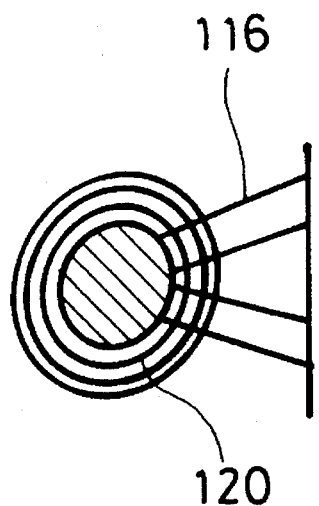
F I G. 4
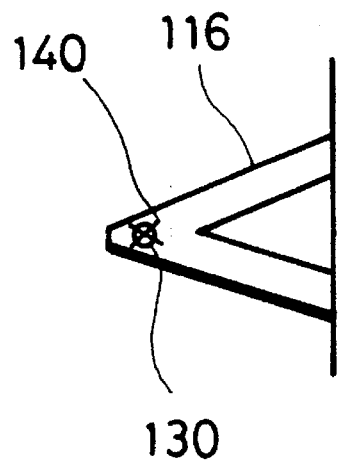
F I G. 5

SCANNING TYPE PROBE MICROSCOPE

BACKGROUND OF THE INVENTION

The present invention relates to a scanning type probe microscope utilizing AFM (scanning type inter-atomic force microscope) principle and the like.

In AFM, non-contact AFM and MFM (scanning type magnetic force microscope) which are all scanning type probe microscopes, in order to obtain information of the topography and the like of a sample surface, minute forces acting between a probe and the sample surface are detected. In order to detect such minute forces, a so-called optical lever method is utilized in many cases. In this method, a laser beam is directed at a cantilever, or spring arm, and changes in the path of the laser beam reflected from the cantilever are detected.

An apparatus which utilizes the above-mentioned optical lever method has a mechanism to adjust the direction of the irradiating laser beam or the position of the cantilever in two directions, or dimensions, so as to position a laser spot at a desired position on the upper face of the cantilever.

Using the above-mentioned adjustment mechanism, the laser spot position on the upper face of the cantilever is subjected to positional determination and adjustment by confirming a situation of relative movement of the laser spot on the upper face of the cantilever while artificially observing it with an optical microscope, or displaying an image obtained by a CCD camera attached to the optical microscope on a CRT display.

FIG. 3 is a block diagram of a laser driving unit of an AFM measurement control system in the prior art. For automatic adjustment of light quantity, or intensity, a monitor current IM is provided by a monitor photodiode MD having a linear characteristic with respect to laser power and current IM is subjected to current-voltage conversion by a current-voltage converter 101. The converted voltage is compared by a comparator 102 with a voltage corresponding to a desired laser power set value set by a laser power setting circuit 104, and the voltage difference signal from comparator 102 controls a current driving circuit 103 which produces a laser driving current IL which is a function of the voltage difference. In such a manner, owing to the constitution in which the monitor current is fed back to a semiconductor laser LD, to produce a laser light beam 118, the laser output power is held at the set value independently of changes in temperature and the like.

SW1 is a laser oscillation changeover switch, wherein the laser is in an oscillation state when switch SW1 is closed, or there is a state in which the laser is not emitting at all when the switch is open.

The positional adjustment of the laser spot on the upper face of the cantilever by the above-mentioned semiconductor laser is performed in an ordinary sample surface measurement state, namely in a laser oscillation state. However, in the laser oscillation state, the area of the laser spot is approximately the same size as the area of the cantilever, and it is therefore difficult to position the center of the laser spot at a desired position on the upper face of the cantilever. Further, in the laser oscillation state, the laser spot has a high brightness level and a complex shape, and it also becomes difficult to specify the center of the laser spot.

SUMMARY OF THE INVENTION

It is therefore a primary object of the present invention to facilitate correct positioning of a laser beam relative to a cantilever in microscope of the type described above.

In the present invention, the above-mentioned and other objects are achieved by a method in which a semiconductor laser is driven with a current value not more than an oscillation threshold value, weak light produced by that current value is irradiated onto the upper face of a cantilever, and a spot generated by the weak light is utilized to perform laser spot positional adjustment on the upper face of the cantilever, while during ordinary sample surface measurement, in order to obtain desired laser power, the semiconductor laser is subjected to switching to a current value not less than the oscillation threshold value.

Owing to the means in which the spot generated by the above-mentioned weak light is utilized to perform the laser spot positional adjustment on the upper face of the cantilever, it is possible to perform the laser spot positional adjustment on the upper face of the cantilever using an extremely small spot as compared to that in the laser oscillation state. In addition, the spot generated by the weak light corresponds to the center of the spot in the laser oscillation state, so that it is possible to specify the center of a laser spot having a complicated shape.

BRIEF DESCRIPTION OF THE DRAWING

FIG. 1 is a block diagram of a laser driving unit of an AFM measurement control system according to the present invention.

FIG. 4 is a pictorial view of a spot in the laser oscillation state irradiated onto the upper face of a cantilever.

FIG. 5 is a pictorial view of a weak light spot irradiated onto the upper face of the cantilever.

DESCRIPTION OF THE PREFERRED EMBODIMENTS

Figure 2:
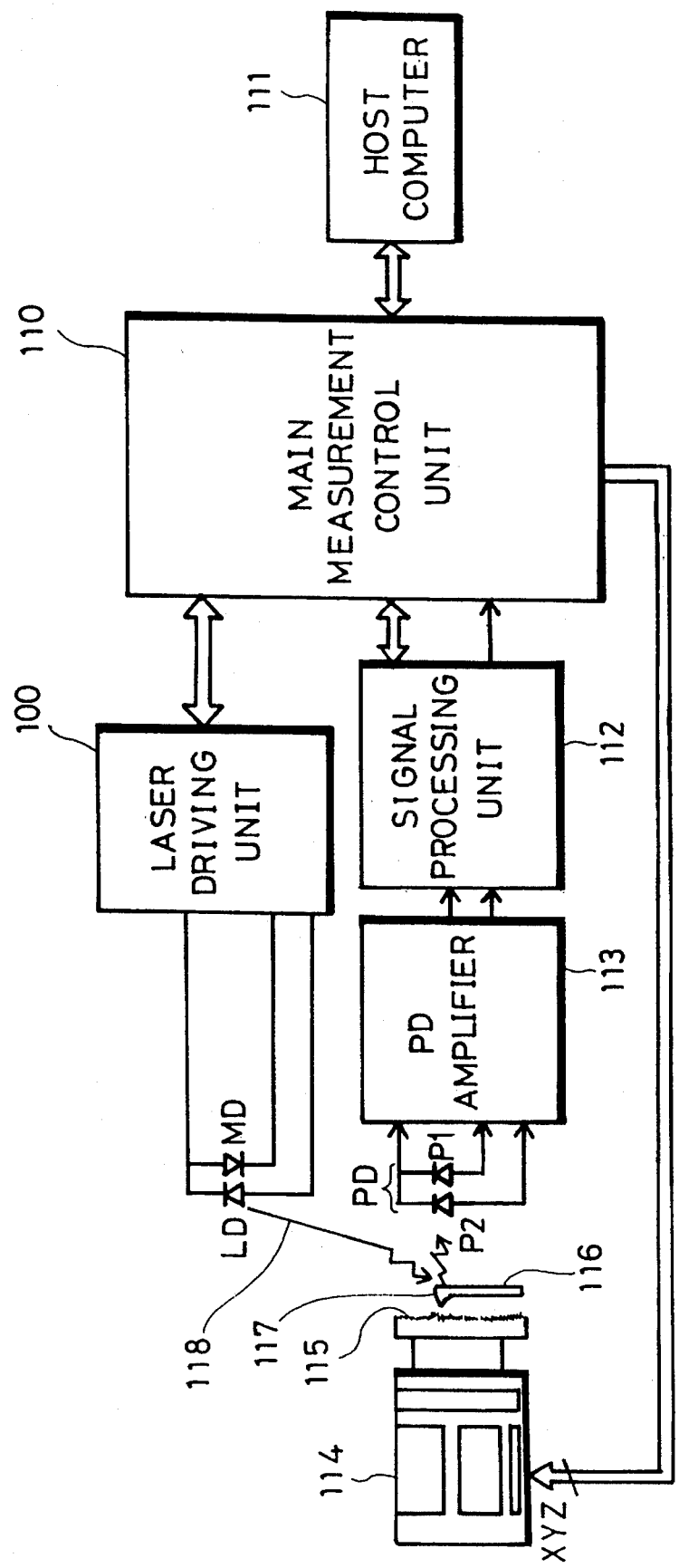
FIG. 2 is an illustrative block diagram of an AFM measurement control unit.

An exemplary, nonlimiting embodiment of the present invention will be described hereinafter with reference to the drawing.

FIG. 2 is an illustrative block diagram of an AFM measurement control unit using the present invention.

With respect to the structure of an AFM, firstly, in order to detect minute inter-atomic forces acting between a surface of a sample 115 and a probe 117 mounted at the free end of a cantilever 116, a so-called optical lever method is utilized in which a laser beam 118 is irradiated onto cantilever 116, changes in the path of the laser beam 118 reflected from the cantilever 116 are detected as a laser spot movement amount on a light-receiving face of two-segment photodetector PD.

In FIG. 2, the laser spot movement amount is expressed by a value of P1–P2, that is a difference in current value between the two segments of photodetector PD. The difference value is amplified in a PD amplifier 113 and the amplified difference value is supplied to a signal processing unit 112. In signal processing unit 112, calculation of P1–P2 (difference value) and calculation of P1+P2 (total light amount) necessary for laser spot positional adjustment on the PD light-receiving face are performed.

In a laser driving unit 100, there is performed an automatic light amount adjusting function for maintaining the power of laser beam 118 constant. The present invention relates to the construction and operation of this laser driving unit 100.

A main measurement control unit 110 is a common component in various scanning type probe microscopes, and is mainly constituted by a control unit which controls movement of a PZT (piezoelectric actuator for scanning) 114, i.e. an optical system including the probe 117 or the sample 115 is displaced along X and Y axes to effect scanning, and a unit in which the above-mentioned P1–P2 (differential value) is fed back to PZT 114 in the Z axis direction after calculation processing so as to control a position in the Z axis direction of the optical system including the probe 117 or the sample 115. Measurement data for the surface of the sample 115 are delivered to a host computer 111, and image processing and display of various measurement data are performed.

FIG. 1 is a block diagram of the laser driving unit of the AFM measurement control system of the present invention.

Figure 3:
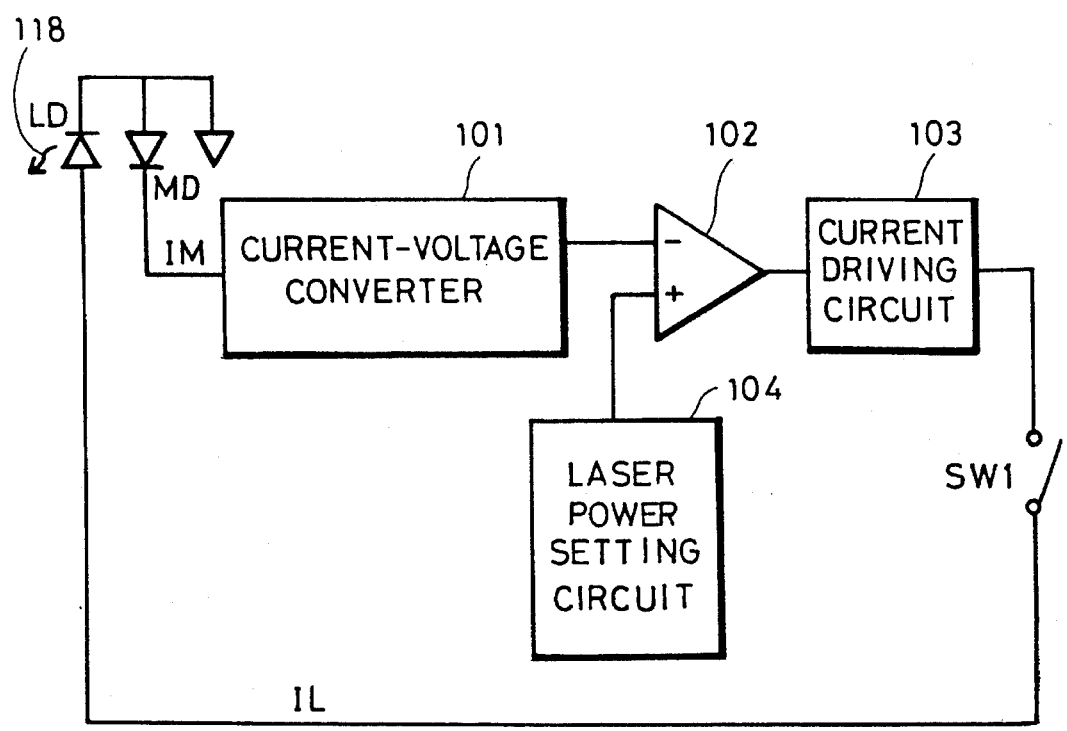
FIG. 3 is a block diagram of a laser driving unit of an AFM measurement control system according to the prior art.

The above-mentioned automatic light amount adjusting function is the same as that performed by the circuit of FIG. 3. However, according to the present invention, a constant current ILW for producing a weak light beam is produced by a constant current circuit 105 for weak light and is added to the current IL. The current ILW for weak light is set to have a low value not greater than the laser oscillation threshold value of semiconductor laser LD, and the current values are in a relative relationship of ILW<<IL. Therefore, in the state where switch SW1 is closed, a driving current of IL+ILW becomes approximately the same as IL, and the same setting as that in FIG. 3 becomes possible. Next, in the state where switch SW1 is open, the laser driving current value becomes ILW to cause laser LD to emit a weak light beam.

FIG. 4 shows the appearance of a spot 120 in the laser oscillation state (semiconductor laser driving current=ILW+IL) impinging on the upper face of cantilever 116.

In the laser oscillation state, the beam brightness is increased, the area of the laser spot 120 becomes large with respect to the cantilever 116, the outline of the laser spot 120 is not circular, but is deformed to have a complex outline, and multiple rings due to interference are formed at the edges, so that it is difficult to position the center of laser spot 120 at a desired point on the upper face portion of the probe at the forward end portion of cantilever 116.

FIG. 5 shows the appearance of a weak light spot 130 (semiconductor laser driving current=ILW) irradiated onto the upper face portion 140 of the probe of the cantilever 116. The laser in the weak light state produces a light beam intensity at the same level as a light emitting diode, so that the brightness is low, the spot becomes extremely small, and it is possible to easily perform positional determination onto the upper face portion 140 of the probe at the forward, or free, end portion of the cantilever 116.

In the method based on the present invention, the laser spot positional adjustment on the upper face of the cantilever can be performed using an extremely small spot as compared with that of the laser oscillation state, so that it becomes possible to make a positional adjustment of the cantilever which is more correct and rapid than in the conventional method. In addition, the frequency that the beam in the laser oscillation state directly enters the light-receiving element of the CCD camera is lowered, so that the present invention is also effective from the viewpoint of protection of the light-receiving element.

This application relates to subject matter disclosed in Japanese Application number 5-74850, filed on Mar. 31, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A scanning microscope for detecting minute interatomic forces acting between a probe and a surface of a sample, comprising: a laser light generator having an oscillation threshold for producing a laser beam; an optical lever including a cantilever carrying the probe and disposed to be irradiated by the laser beam and to reflect the laser beam along a path; a two-segment photodetector disposed for detecting movement of the path of the reflected laser beam in response to movement of the cantilever; and a laser driving unit for supplying a driving current to the laser light generator for causing the laser beam produced by the laser light generator to have a brightness controlled by the driving current, the driving current having an oscillation threshold value corresponding to the oscillation threshold, wherein said laser driving unit comprises a monitor diode disposed for monitoring the laser beam and for producing an output current representative of the brightness of the laser beam, a current-voltage converter connected for converting the current from the monitoring diode to a voltage, a comparator connected for comparing the voltage from said current-voltage converter with a voltage preset in a laser power setting circuit, a current driving circuit which converts an output from the comparator to a current for driving the laser light generator to cause the laser beam to have a first spot size, and a constant current circuit connected for driving the laser light generator to cause the laser light generator to produce a light beam having a second spot size which is smaller than the first spot size, and a switch provided between the current driving circuit and the laser light generator, the switch having an off state for causing the light beam to have the second spot size for positioning the light beam at an appropriate location on the cantilever.

2. In a scanning type probe microscope including beam forming means for causing a laser beam to irradiate a cantilever and to be reflected along a path from the cantilever, and means for detecting changes in the position of the path of the reflected laser beam, the improvement wherein said beam forming means comprise a semiconductor laser for producing the beam in response to a driving current, the semiconductor laser having an oscillation state in response to a driving current having a value greater than an oscillation threshold value for producing a laser beam having a first spot size, and means coupled to said semiconductor laser for supplying a driving current having a value not greater than the oscillation threshold value for producing a light beam having a spot size smaller than the first spot size to perform positional adjustment of the laser beam on the cantilever.

\* \* \* \* \*